United States Patent
Noda

(10) Patent No.: US 12,071,082 B2
(45) Date of Patent: Aug. 27, 2024

(54) STORING APPARATUS, COMMUNICATION SYSTEM, STORING METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Tetsuya Noda, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 1024 days.

(21) Appl. No.: 16/978,028

(22) PCT Filed: Mar. 4, 2019

(86) PCT No.: PCT/JP2019/008265
§ 371 (c)(1),
(2) Date: Sep. 3, 2020

(87) PCT Pub. No.: WO2019/172154
PCT Pub. Date: Sep. 12, 2019

(65) Prior Publication Data
US 2021/0001792 A1 Jan. 7, 2021

(30) Foreign Application Priority Data
Mar. 5, 2018 (JP) .................. 2018-038859

(51) Int. Cl.
*B60R 16/023* (2006.01)
*G06F 8/658* (2018.01)
*H04L 12/40* (2006.01)

(52) U.S. Cl.
CPC .......... *B60R 16/0231* (2013.01); *G06F 8/658* (2018.02); *H04L 12/40* (2013.01); *H04L 2012/40215* (2013.01)

(58) Field of Classification Search
CPC ..... B60R 16/0231; G06F 8/658; H04L 12/40; H04L 2012/40215
See application file for complete search history.

(56) References Cited

U.S. PATENT DOCUMENTS

| | | | | |
|---|---|---|---|---|
| 2004/0008633 A1* | 1/2004 | Youn | ........... | H04L 12/12 370/254 |
| 2011/0112969 A1* | 5/2011 | Zaid | ........... | G06F 21/35 701/2 |

(Continued)

FOREIGN PATENT DOCUMENTS

JP  2017-004331 A  1/2017

OTHER PUBLICATIONS

Krishna, Vamsi, "How to Automatically Disable Wifi When Connected to a Wired Connection", Make Tech Easier, Nov. 16, 2017.

(Continued)

*Primary Examiner* — Wei Y Zhen
*Assistant Examiner* — Brahim Bourzik
(74) *Attorney, Agent, or Firm* — Honigman LLP

(57) ABSTRACT

In a relay apparatus, if partial data that is a portion of update data that is used to update a control program is input to a second input/output unit, a control unit stores the partial data in a storage unit. If partial data is input to a first input/output unit while partial data is being repeatedly input to the second input/output unit, the control unit stops storing the partial data input to the second input/output unit and stores the partial data input to the first input/output unit in the storage unit.

7 Claims, 7 Drawing Sheets

(56) References Cited

U.S. PATENT DOCUMENTS

| | | | | |
|---|---|---|---|---|
| 2012/0106537 A1* | 5/2012 | Yousefi | ................... | H04L 12/56 |
| | | | | 370/310 |
| 2014/0298138 A1* | 10/2014 | Gladwin | ............... | G06F 11/108 |
| | | | | 714/763 |
| 2017/0257227 A1* | 9/2017 | Endo | ....................... | H04L 69/14 |
| 2018/0275983 A1* | 9/2018 | Kwon | ....................... | G06F 8/65 |
| 2019/0315295 A1 | 10/2019 | Mizutani | | |
| 2021/0117177 A1* | 4/2021 | Noda | ....................... | G06F 8/65 |
| 2022/0342654 A1* | 10/2022 | Ishikawa | ................... | G06F 8/65 |

OTHER PUBLICATIONS

International Search Report, Application No. PCT/JP2019/008265, mailed Apr. 9, 2019. ISA/Japan Patent Office.

* cited by examiner

STORING APPARATUS, COMMUNICATION SYSTEM, STORING METHOD, AND COMPUTER PROGRAM

CROSS-REFERENCE TO RELATED APPLICATIONS

This application is the U.S. national stage of PCT/JP2019/008265 filed on Mar. 4, 2019, which claims priority of Japanese Patent Application No. JP 2018-038859 filed on Mar. 5, 2018, the contents of which are incorporated herein.

TECHNICAL FIELD

The present disclosure relates to a storing apparatus, a communication system, a storing method, and a computer program.

BACKGROUND

JP 2017-105309A discloses a processing apparatus for a vehicle that executes processing by executing a control program. This processing apparatus is detachably connected to a diagnostic tool. Update data that is used to update the control program is input from the diagnostic tool to the processing apparatus and update data received via wireless communication is input to the processing apparatus.

While update data is being input from the diagnostic tool, the processing apparatus described in JP 2017-105309A prohibits input of update data received via wireless communication, and while update data received via wireless communication is being input, the processing apparatus prohibits input of update data from the diagnostic tool. The control program is updated using update data input from the diagnostic tool or update data received via wireless communication.

A diagnostic tool is usually operated by a dealer. Updating of a control program that is performed using update data input from a diagnostic tool is highly likely to be performed by a dealer in a shop, a factory, etc., to which a vehicle has been brought, to find a cause of a problem in processing, for example. On the other hand, updating of a control program that is performed using update data received via wireless communication is highly likely to be performed at an unspecified location after receiving permission from an occupant of the vehicle, for example. In view of the above circumstances, updating of a control program performed using update data input from a diagnostic tool is more important than updating of a control program performed using update data received via wireless communication.

Assume that, at a point in time at which a dealer updates a control program by using a diagnostic tool, the control program is being updated using update data received via wireless communication. In this case, the dealer needs to wait until the update data received via wireless communication is input and updating of the control program is complete. After updating of the control program is complete, the dealer again updates the control program using the diagnostic tool. In this case, the control program is unnecessarily updated using the update data received via wireless communication.

Therefore, the present disclosure aims to provide a storing apparatus, a communication system, a storing method, and a computer program that can prevent a control program from being unnecessarily updated using update data received via wireless communication.

SUMMARY

A storing apparatus according to one aspect of the present disclosure includes a first input unit that is configured to be detachably connected to an external apparatus and to which partial data is input from the external apparatus, the partial data being a portion of update data that is used to update a control program, a second input unit to which partial data received via wireless communication is input, a storage unit in which the partial data is stored, and a storing unit configured such that, if partial data is input to the second input unit, the storage unit stores the partial data input to the second input unit in the storage unit, and if partial data is input to the first input unit while partial data is being repeatedly input to the second input unit, the storing unit stops storing the partial data input to the second input unit and stores the partial data input to the first input unit in the storage unit.

A communication system according to one aspect of the present disclosure includes a storing apparatus configured to store partial data that is a portion of update data that is used to update a control program and a processing apparatus that is connected to the storing apparatus and configured to execute processing by executing the control program, wherein the storing apparatus includes a first input unit that is configured to be detachably connected to an external apparatus and to which partial data is input from the external apparatus, a second input unit to which partial data received via wireless communication is input, a storage unit in which the partial data is stored, a storing unit configured such that, if partial data is input to the second input unit, the storing unit stores the partial data input to the second input unit in the storage unit, and if partial data is input to the first input unit while partial data is being repeatedly input to the second input unit, the storing unit stops storing the partial data input to the second input unit and stores the partial data input to the first input unit in the storage unit, and a transmission unit configured to transmit the partial data to the processing apparatus.

A storing method according to one aspect of the present disclosure includes, if partial data that is a portion of update data that is used to update a control program is received via wireless communication, storing the received partial data, if partial data is input via wired communication while partial data is being repeatedly received via wireless communication, stopping storing the partial data received via wireless communication, and if partial data is input via wired communication while partial data is being repeatedly received via wireless communication, storing the partial data input via wired communication.

A computer program according to one aspect of the present disclosure causes a computer to execute the followings: if partial data that is a portion of update data that is used to update a control program is received via wireless communication, storing the received partial data, if partial data is input via wired communication while partial data is being repeatedly received via wireless communication, stopping storing the partial data received via wireless communication, and if partial data is input via wired communication while partial data is being repeatedly received via wireless communication, storing the partial data received via wired communication.

Note that the present disclosure can be realized not only as a storing apparatus that includes the above-described characteristic processing units but also as a storing method that includes the above-described characteristic processing as steps or a computer program for causing a computer to execute these steps. Also, the present disclosure can be realized as a semiconductor integrated circuit that realizes a portion or the entirety of the storing apparatus or a communication system that includes the storing apparatus.

First, aspects of implementation of the present disclosure will be listed and described. At least some of the following embodiments may also be combined as desired.

A storing apparatus according to one aspect of the present disclosure includes a first input unit that is configured to be detachably connected to an external apparatus and to which partial data is input from the external apparatus, the partial data being a portion of update data that is used to update a control program, a second input unit to which partial data received via wireless communication is input, a storage unit in which the partial data is stored, and a storing unit configured such that, if partial data is input to the second input unit, the storing unit stores the partial data input to the second input unit in the storage unit, and if partial data is input to the first input unit while partial data is being repeatedly input to the second input unit, the storing unit stops storing the partial data input to the second input unit and stores the partial data input to the first input unit in the storage unit.

A storing apparatus according to one aspect of the present disclosure further includes an output unit configured such that, if partial data is input to the first input unit while partial data is being repeatedly input to the second input unit, the output unit outputs transmission stop data for giving an instruction to stop repeated wireless transmission of the partial data.

A storing apparatus according to one aspect of the present disclosure further includes a deletion unit configured such that, if partial data is input to the first input unit while partial data is being repeatedly input to the second input unit, the deletion unit deletes, from the storage unit, partial data that has been input to the second input unit and stored in the storage unit.

A storing apparatus according to one aspect of the present disclosure further includes a determination unit configured such that, if partial data is input to the first input unit while partial data is being repeatedly input to the second input unit, the determination unit determines whether or not a version of the control program after being updated using update data relating to the partial data input to the first input unit will be the same as a version of the control program after being updated using update data relating to the partial data input to the second input unit, and a second output unit configured such that, if it is determined by the determination unit that the version of the control program after being updated using the update data relating to the partial data input to the first input unit will be the same as the version of the control program after being updated using the update data relating to the partial data input to the second input unit, the second output unit outputs, to the external apparatus, output request data for requesting output of remaining partial data that constitutes the update data.

A communication system according to one aspect of the present disclosure includes a storing apparatus configured to store partial data that is a portion of update data that is used to update a control program and a processing apparatus that is connected to the storing apparatus and configured to execute processing by executing the control program, wherein the storing apparatus includes a first input unit that is configured to be detachably connected to an external apparatus and to which partial data is input from the external apparatus, a second input unit to which partial data received via wireless communication is input, a storage unit in which the partial data is stored, a storing unit configured such that, if partial data is input to the second input unit, the storing unit stores the partial data input to the second input unit in the storage unit, and if partial data is input to the first input unit while partial data is being repeatedly input to the second input unit, the storing unit stops storing the partial data input to the second input unit and stores the partial data input to the first input unit in the storage unit, and a transmission unit configured to transmit the partial data to the processing apparatus.

A storing method according to one aspect of the present disclosure includes, if partial data that is a portion of update data that is used to update a control program is received via wireless communication, storing the received partial data, if partial data is input via wired communication while partial data is being repeatedly received via wireless communication, stopping storing the partial data received via wireless communication, and if partial data is input via wired communication while partial data is being repeatedly received via wireless communication, storing the partial data input via wired communication.

A computer program according to one aspect of the present disclosure causes a computer to execute the followings: if partial data that is a portion of update data that is used to update a control program is received via wireless communication, storing the received partial data, if partial data is input via wired communication while partial data is being repeatedly received via wireless communication, stopping storing the partial data received via wireless communication, and if partial data is input via wired communication while partial data is being repeatedly received via wireless communication, storing the partial data received via wired communication.

In the storing apparatus, storing method, and computer program according to the above-described aspects, if partial data is input via wired communication while partial data received via wireless communication is being repeatedly input, storing of the partial data received via wireless communication in the storage unit is stopped and the partial data input via wired communication is stored in the storage unit. Therefore, the control program can be prevented from being unnecessarily updated using update data that is constituted by a plurality of pieces of partial data received via wireless communication.

In the storing apparatus according to the above-described aspect, if partial data is input via wired communication while partial data received via wireless communication is being repeatedly input, the transmission stop data is output. As a result, repeated wireless transmission of the partial data is stopped.

In the storing apparatus according to the above-described aspect, if partial data is input via wired communication while partial data received via wireless communication is being repeatedly input, partial data that has been received via wireless communication and stored in the storage unit is deleted from the storage unit.

Assume that, in the storing apparatus according to the above-described aspect, partial data is input via wired communication while partial data received via wireless communication is being repeatedly input. In this case, determination is made as to whether not a version of the control program after being updated using update data relating to the partial data input via wired communication will be the same as a version of the control program after being updated using update data relating to the partial data received via wireless communication. If it is determined that the versions will be the same, the output request data is output to the external apparatus to cause the external apparatus to output remaining partial data of a plurality of pieces of partial data that constitute the update data via wired communication. Therefore, the time it takes to acquire the update data is short.

In the communication system according to the above-described aspect, the storing apparatus transmits partial data to the processing apparatus. The processing apparatus updates the control program using update data that is constituted by a plurality of pieces of received partial data.

Advantageous Effects of Present Disclosure

According to the present disclosure, a control program can be prevented from being unnecessarily updated using update data received via wireless communication.

DETAILED DESCRIPTION OF PREFERRED EMBODIMENTS

The following describes specific examples of communication systems according to embodiments of the present disclosure with reference to the accompanying drawings. Note that the present disclosure is not limited to these examples, but is defined by the claims, and is intended to encompass all modifications within the meanings and scope that are equivalent to the claims.

Embodiment 1

Figure 1:
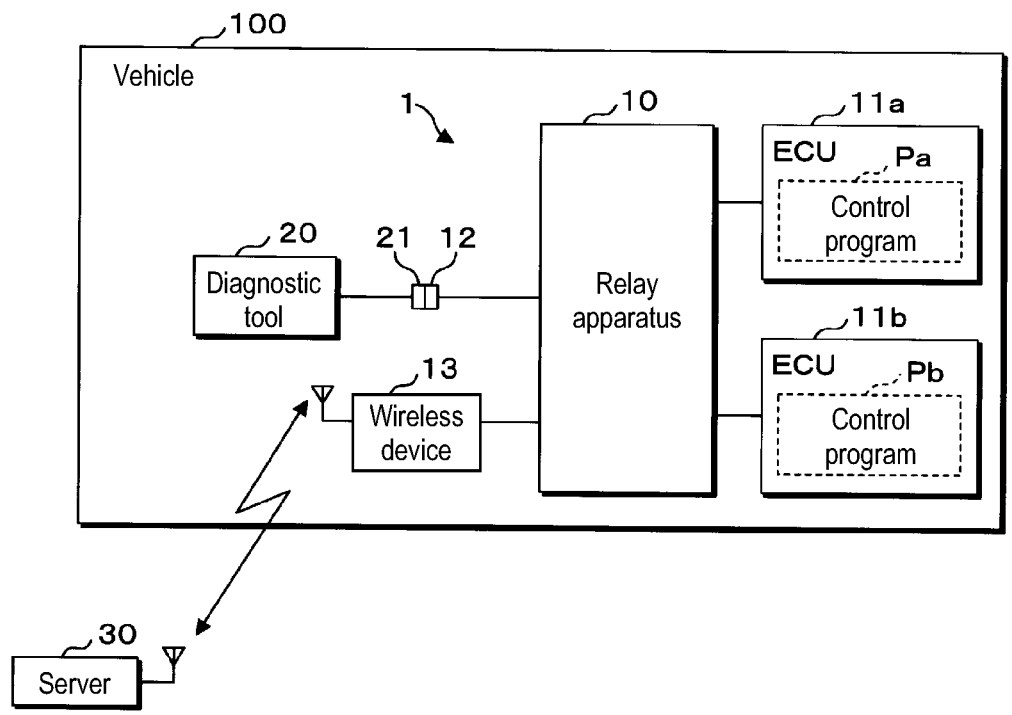
FIG. 1 is a block diagram showing a configuration of a main portion of a communication system in Embodiment 1.

FIG. 1 is a block diagram showing a configuration of a main portion of a communication system 1 in Embodiment 1. The communication system 1 is favorably installed in a vehicle 100 and includes a relay apparatus 10, ECUs 11a and 11b, a connector 12, and a wireless device 13. The ECUs 11a and 11b, the connector 12, and the wireless device 13 are individually connected to the relay apparatus 10.

The connector 12 is detachably connected to a connector 21 that is connected to a diagnostic tool 20. The diagnostic tool 20 is a portable device that can be carried. If the connector 12 is connected to the connector 21, the relay apparatus 10 is connected to the diagnostic tool 20. If the connectors 12 and 21 are disconnected from each other, the diagnostic tool 20 and the relay apparatus 10 are disconnected from each other.

Electrical devices (not shown) that are installed in the vehicle 100 are connected to the ECUs 11a and 11b, respectively. Each of the ECUs 11a and 11b includes one or more CPUs (Central Processing Units, not shown). A control program Pa is stored in the ECU 11a. The one or more CPUs included in the ECU 11a execute control processing for controlling operations of the electrical device connected to the ECU 11a by executing the control program Pa. Similarly, a control program Pb is stored in the ECU 11b. The one or more CPUs included in the ECU 11b execute control processing for controlling operations of the electrical device connected to the ECU 11b by executing the control program Pb.

The relay apparatus 10 functions as a storing apparatus. Each of the ECUs 11a and 11b functions as a processing apparatus.

Each of the ECUs 11a and 11b transmits data to the relay apparatus 10. The relay apparatus 10 transmits data received from the ECU 11a to the ECU 11b and transmits data received from the ECU 11b to the ECU 11a. Thus, the ECUs 11a and 11b communicate with each other via the relay apparatus 10 to cause the plurality of electrical devices connected to the ECUs 11a and 11b to operate in cooperation with each other. In this communication, a protocol that corresponds to Ethernet (registered trademark) or a CAN (Controller Area Network) protocol is used as a communication protocol, for example.

Figure 10:
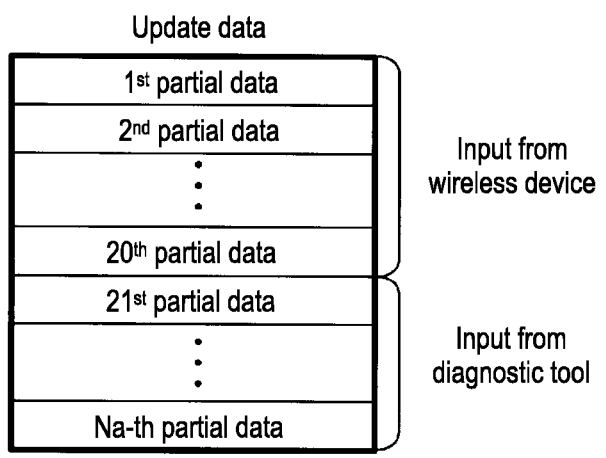
FIG. 10 is a schematic diagram showing a configuration of update data.

Update data that is used to update the control program Pa is constituted by Na pieces of partial data (see FIG. 10). Accordingly, partial data is a portion of the update data. Na is an integer of at least 2. Partial data includes version information that indicates a version of the control program Pa after being updated and number information that indicates an arrangement number, in addition to program information that indicates a portion of the control program Pa after being updated. The update data is realized as a result of the Na pieces of partial data being arranged in the order of arrangement numbers.

The relay apparatus 10 repeatedly transmits partial data to the ECU 11a. Upon receiving partial data from the relay apparatus 10, the ECU 11a stores the received partial data. Upon having stored Na pieces of partial data, i.e., update data, the ECU 11a waits until the vehicle 100 enters a state in which the control program Pa can be updated. If the vehicle 100 has entered a state in which the control program Pa can be updated, the one or more CPUs included in the ECU 11a update the control program Pa using the update data.

Note that a state in which the control program Pa can be updated is a state in which an ignition switch of the vehicle 100 is turned OFF, for example.

If updating of the control program Pa that is to be performed using update data relating to partial data that is being transmitted becomes unnecessary while partial data is being repeatedly transmitted to the ECU 11a, the relay apparatus 10 transmits deletion instruction data for giving an instruction to delete partial data to the ECU 11a. Upon receiving the deletion instruction data, the ECU 11a deletes all partial data received from the relay apparatus 10.

Similarly, update data that is used to update the control program Pb is constituted by Nb pieces of partial data. Nb is an integer of at least 2. Partial data includes version information that indicates a version of the control program Pb after being updated and number information that indicates an arrangement number, in addition to program information that indicates a portion of the control program Pb after being updated.

Updating of the control program Pb and deletion of partial data that are performed by the ECU 11b are similar to updating of the control program Pa and deletion of partial data performed by the ECU 11a, respectively. Specifically, in the description of updating of the control program Pa and deletion of partial data performed by the ECU 11a, the ECU 11a, the control program Pa, and the integer Na are replaced with the ECU 11b, the control program Pb, and the integer Nb, respectively. Thus, updating of the control program Pb and deletion of partial data performed by the ECU 11b can be described.

The diagnostic tool 20 includes an operation portion (not shown) that is operated by a user, e.g., a dealer. The diagnostic tool 20 operates in accordance with an operation made to the operation portion. If the connector 21 is connected to the connector 12, the diagnostic tool 20 outputs first request data for requesting authentication of the diagnostic tool 20 to the relay apparatus 10. The first request data includes information such as identification information, a password, etc. When the first request data is input, the relay apparatus 10 performs authentication of the diagnostic tool 20 based on the information included in the input first request data. If the authentication is successful, the relay apparatus 10 outputs output permission data for permitting output of data, to the diagnostic tool 20.

After the output permission data is input, the diagnostic tool 20 outputs various kinds of data to the relay apparatus 10. Specifically, the diagnostic tool 20 repeatedly outputs partial data relating to update data of the control program Pa via the connectors 21 and 12 to the relay apparatus 10. Similarly, the diagnostic tool 20 repeatedly outputs partial data relating to update data of the control program Pb via the connectors 21 and 12 to the relay apparatus 10.

Upon receiving data from a server 30 that is provided outside the vehicle 100 by via wireless communication, the wireless device 13 outputs the received data to the relay apparatus 10. Furthermore, if data is input from the relay apparatus 10, the wireless device 13 wirelessly transmits the input data to the server 30.

If conditions for transmitting update data of the control program Pa or the control program Pb are satisfied, the server 30 transmits second request data for requesting authentication of the server 30 to the wireless device 13. The second request data includes information such as identification information, a password, etc. Upon receiving the second request data, the wireless device 13 outputs the received second request data to the relay apparatus 10. When the second request data is input, the relay apparatus 10 performs authentication of the server 30 based on the information included in the input second request data.

If the authentication is successful, the relay apparatus 10 outputs transmission permission data for permitting transmission of data, to the wireless device 13. The wireless device 13 wirelessly transmits the transmission permission data to the server 30. Upon receiving the transmission permission data from the wireless device 13, the server 30 repeatedly transmits partial data relating to update data of the control program Pa or the control program Pb to the wireless device 13 via wireless communication. Every time the wireless device 13 receives partial data relating to update data of the control program Pa or the control program Pb from the server 30 via wireless communication, the wireless device 13 outputs the received partial data to the relay apparatus 10.

The server 30 repeatedly transmits partial data relating to update data of the control program Pa to the wireless device 13 via wireless communication and repeatedly transmits partial data relating to update data of the control program Pb to the wireless device 13 via wireless communication.

The relay apparatus 10 outputs transmission stop data for giving an instruction to stop repeated wireless transmission of partial data, to the wireless device 13. When the transmission stop data is input from the relay apparatus 10, the wireless device 13 wirelessly transmits the input transmission stop data to the server 30. Upon receiving the transmission stop data from the wireless device 13 while repeatedly transmitting partial data relating to update data of the control program Pa or the control program Pb to the wireless device 13, the server 30 stops repeated transmission of the partial data. Thereafter, if conditions for transmitting update data of the control program Pa or the control program Pb are satisfied, the server 30 again transmits second request data to the wireless device 13 and repeatedly transmits partial data to the wireless device 13.

Figure 2:
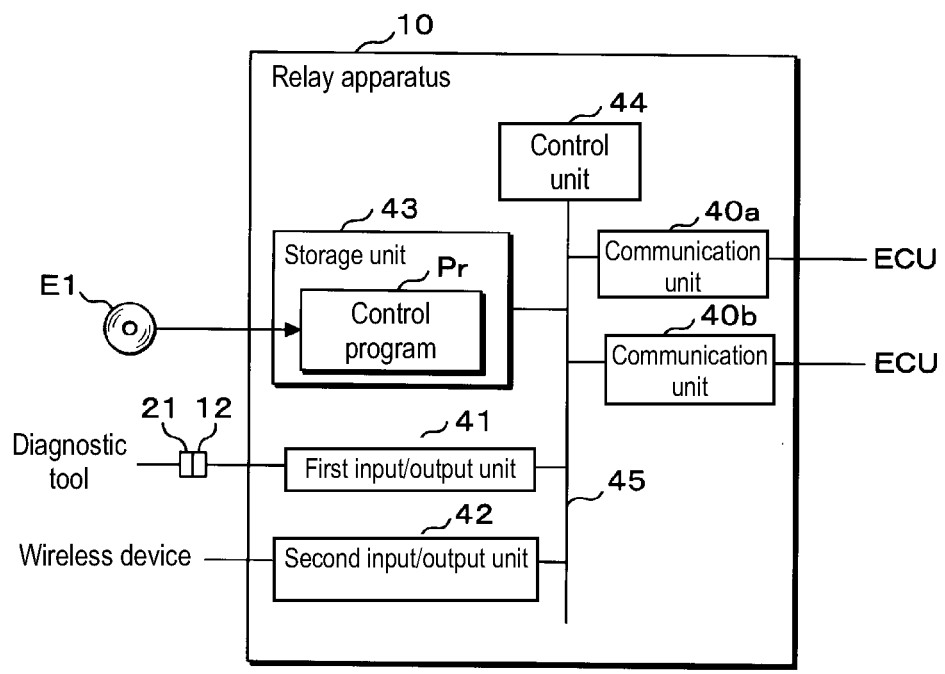
FIG. 2 is a block diagram showing a configuration of a main portion of a relay apparatus.

FIG. 2 is a block diagram showing a configuration of a main portion of the relay apparatus 10. The relay apparatus 10 includes two communication units 40a and 40b, a first input/output unit 41, a second input/output unit 42, a storage unit 43, and a control unit 44. These units are connected to an internal bus 45. The communication unit 40a is further connected to the ECU 11a. The communication unit 40b is further connected to the ECU 11b. The first input/output unit 41 is further connected to the connector 12. The second input/output unit 42 is further connected to the wireless device 13.

If the connector 12 is connected to the connector 21, the diagnostic tool 20 is connected to the first input/output unit 41. If the connectors 12 and 21 are disconnected from each other, the diagnostic tool 20 and the first input/output unit 41 are also disconnected from each other. Thus, the first input/output unit 41 is detachably connected to the diagnostic tool 20. The diagnostic tool 20 corresponds to an external apparatus.

The communication unit 40a transmits data to the ECU 11a following an instruction from the control unit 44. One example of data transmitted by the communication unit 40a to the ECU 11a is partial data relating to update data of the control program Pa. The communication unit 40a receives data from the ECU 11a.

Similarly, the communication unit 40b transmits data to the ECU 11b following an instruction from the control unit 44. One example of data transmitted by the communication unit 40b to the ECU 11b is partial data relating to update data of the control program Pb. The communication unit 40b receives data from the ECU 11b.

The first input/output unit 41 outputs output permission data to the diagnostic tool 20 via the connectors 12 and 21 following an instruction from the control unit 44. Also, partial data relating to update data of the control program Pa is repeatedly input from the diagnostic tool 20 to the first input/output unit 41 via the connectors 21 and 12. Similarly, partial data relating to update data of the control program Pb is repeatedly input from the diagnostic tool 20 to the first input/output unit 41 via the connectors 21 and 12. The first input/output unit 41 functions as a first input unit.

The second input/output unit 42 outputs transmission permission data and transmission stop data to the wireless device 13 following an instruction from the control unit 44. As described above, if data is input to the wireless device 13, the wireless device 13 wirelessly transmits the input data to the server 30. Upon receiving transmission permission data from the wireless device 13, the server 30 starts to repeatedly transmit partial data relating to update data of the control program Pa or the control program Pb. Furthermore, upon receiving transmission stop data from the wireless device 13, the server 30 stops repeated transmission of partial data.

Also, second request data that the wireless device 13 has received from the server 30 is input to the second input/output unit 42. Furthermore, partial data that the wireless device 13 has received from the server 30 via wireless communication is repeatedly input from the wireless device 13 to the second input/output unit 42. Accordingly, partial data relating to update data of the control program Pa and partial data relating to update data of the control program Pb are input to the second input/output unit 42. The second input/output unit 42 functions as a second input unit.

The storage unit 43 is a non-volatile memory. Partial data relating to update data of the control programs Pa and Pb is stored in the storage unit 43 by the control unit 44.

A control program Pr is further stored in the storage unit 43. The control unit 44 includes one or more CPUs. The one or more CPUs included in the control unit 44 execute relay processing, tool authentication processing, server authentication processing, first update data storing processing, second update data storing processing, and update data transmission processing by executing the control program Pr. The first update data storing processing, the second update data storing processing, and the update data transmission processing each include processing relating to the control program Pa and processing relating to the control program Pb. The control unit 44 executes the relay processing, the tool authentication processing, the server authentication processing, the first update data storing processing, the second update data storing processing, and the update data transmission processing in parallel using a time division method.

The relay processing is processing for relaying communication between the ECUs 11a and 11b. The tool authentication processing is processing for authenticating the diagnostic tool 20. The server authentication processing is processing for authenticating the server 30 that communicates with the wireless device 13.

The first update data storing processing relating to the control program Pa is processing for storing update data of the control program Pa that is input from the diagnostic tool 20 to the first input/output unit 41. The second update data storing processing relating to the control program Pa is processing for storing update data of the control program Pa that is input from the wireless device 13 to the second input/output unit 42. The update data transmission processing relating to the control program Pa is processing for transmitting update data relating to the control program Pa to the ECU 11a.

Similarly, the first update data storing processing relating to the control program Pb is processing for storing update data of the control program Pb that is input from the diagnostic tool 20 to the first input/output unit 41. The second update data storing processing relating to the control program Pb is processing for storing update data of the control program Pb that is input from the wireless device 13 to the second input/output unit 42. The update data transmission processing relating to the control program Pb is processing for transmitting update data relating to the control program Pb to the ECU 11b.

The control program Pr is a computer program for causing the one or more CPUs included in the control unit 44 to execute the relay processing, the tool authentication processing, the server authentication processing, the first update data storing processing, the second update data storing processing, and the update data transmission processing.

Note that the control program Pr may also be stored in a storage medium E1 such that the one or more CPUs included in the control unit 44 can read the control program Pr. In this case, the control program Pr that has been read from the storage medium E1 by a reading apparatus (not shown) is stored in the storage unit 43. The storage medium E1 is an optical disk, a flexible disk, a magnetic disk, a magnetic optical disk, or a semiconductor memory, for example. The optical disk is a CD (Compact Disc)-ROM (Read Only Memory), a DVD (Digital Versatile Disc)-ROM, or a BD (Blu-ray (registered trademark) Disc), for example. The magnetic disk is a hard disk, for example. A configuration is also possible in which the control program Pr is downloaded from an external apparatus (not shown) that is connected to a communication network (not shown) and the downloaded control program Pr is stored in the storage unit 43.

If one of the communication units 40a and 40b has received data, the control unit 44 executes the relay processing. The control unit 44 selects a communication unit that is to transmit data, from the communication units 40a and 40b, based on information included in the received data, and instructs the selected communication unit to transmit the received data. As a result, the communication unit selected by the control unit 44 transmits the received data. After giving the instruction to transmit the received data, the control unit 44 ends the relay processing.

If first request data is input from the diagnostic tool 20 to the first input/output unit 41, the control unit 44 executes the tool authentication processing. In the tool authentication processing, the control unit 44 performs authentication of the diagnostic tool 20 based on information included in the input first request data. If the authentication of the diagnostic tool 20 is successful, the control unit 44 instructs the first input/output unit 41 to output output permission data. As a result, the first input/output unit 41 outputs the output permission data to the diagnostic tool 20, and the diagnostic tool 20 outputs various kinds of data to the first input/output unit 41. If the authentication of the diagnostic tool 20 is not successful or the instruction to output the output permission data has been given, the control unit 44 ends the tool authentication processing.

If second request data is input from the wireless device 13 to the second input/output unit 42, the control unit 44 executes the server authentication processing. In the server authentication processing, the control unit 44 performs authentication of the server 30 based on information included in the input second request data. If the authentication of the server 30 is successful, the control unit 44 instructs the second input/output unit 42 to output transmission permission data. As a result, the second input/output unit 42 outputs the transmission permission data to the wireless device 13, and the wireless device 13 transmits the transmission permission data to the server 30. As described above, upon receiving the transmission permission data, the server 30 starts to repeatedly transmit partial data. If the authentication of the server 30 is not successful or the instruction to transmit the transmission permission data has been given, the control unit 44 ends the server authentication processing.

Figure 3:
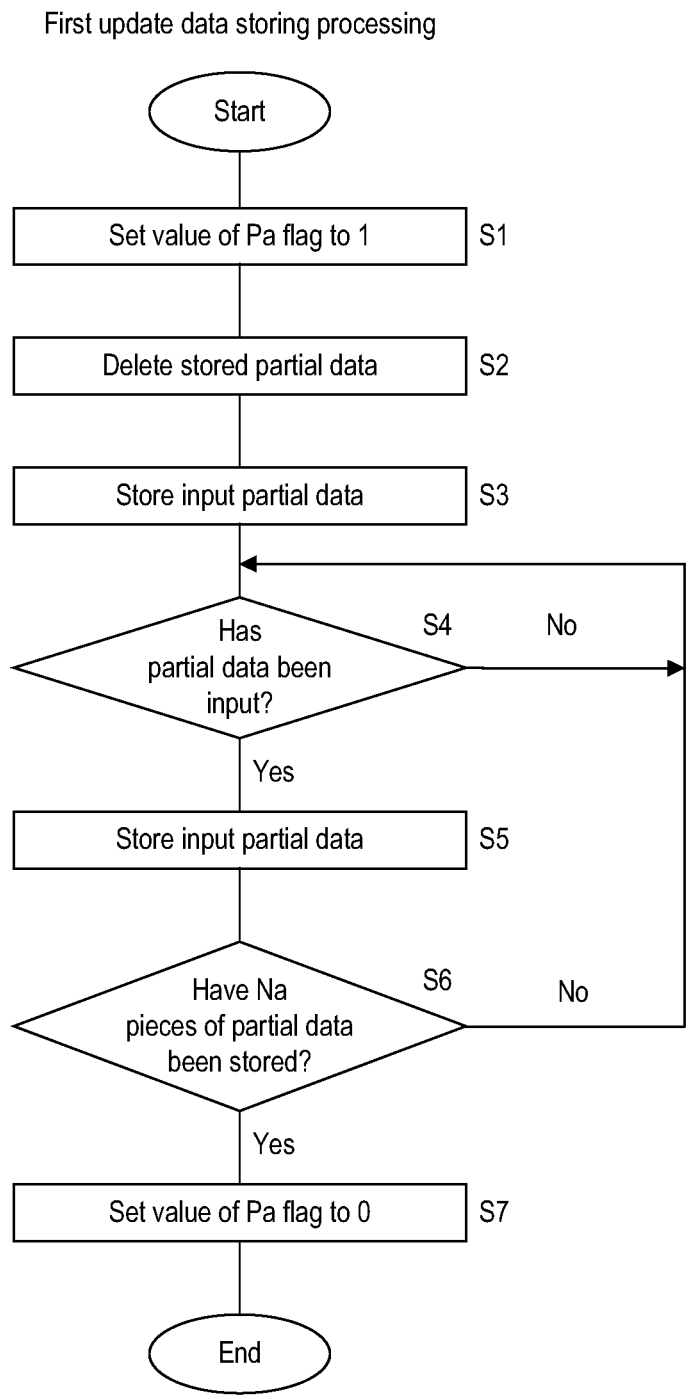
FIG. 3 is a flowchart showing a procedure of first update data storing processing relating to a control program.

FIG. 3 is a flowchart showing a procedure of the first update data storing processing relating to the control program Pa. If partial data relating to update data of the control program Pa is input to the first input/output unit 41, the control unit 44 executes the first update data storing processing relating to the control program Pa.

A value of a flag (hereinafter referred to as a "Pa flag") relating to the control program Pa is stored in the storage unit 43. The value of the Pa flag is set to 0 or 1 by the control unit 44. The value of the Pa flag being 0 indicates that partial data relating to update data of the control program Pa is not being repeatedly input from the diagnostic tool 20 to the first input/output unit 41. The value of the Pa flag being 1 indicates that partial data relating to update data of the control program Pa is being repeatedly input from the diagnostic tool 20 to the first input/output unit 41.

In the first update data storing processing relating to the control program Pa, the control unit 44 first sets the value of the Pa flag to 1 (step S1), and deletes all partial data that has already been stored in the storage unit 43 with respect to update data of the control program Pa (step S2). Next, the control unit 44 stores, in the storage unit 43, partial data that has been input to the first input/output unit 41 when the first update data storing processing has been started (step S3), and determines whether or not partial data relating to update data of the control program Pa has been further input to the first input/output unit 41 (step S4).

Upon determining that partial data has not been input to the first input/output unit 41 (S4: NO), the control unit 44 executes step S4 and waits until partial data relating to update data of the control program Pa is newly input to the first input/output unit 41. Upon determining that partial data has been input to the first input/output unit 41 (S4: YES), the control unit 44 stores the partial data input to the first input/output unit 41 in the storage unit 43 (step S5), and determines whether or not Na pieces of partial data relating to update data of the control program Pa have been stored in the storage unit 43 (step S6).

Upon determining that Na pieces of partial data have not been stored (S6: NO), the control unit 44 executes step S4 and again waits until partial data relating to update data of the control program Pa is newly input to the first input/output unit 41. Upon determining that Na pieces of partial data have been stored (S6: YES), the control unit 44 sets the value of the Pa flag to 0 (step S7) and ends the first update data storing processing relating to the control program Pa.

As described above, if partial data relating to update data of the control program Pa is input to the first input/output unit 41, the control unit 44 executes the first update data storing processing relating to the control program Pa. In this first update data storing processing, the control unit 44 stores Na pieces of partial data, i.e., update data, that is input to the first input/output unit 41 in the storage unit 43 after deleting all partial data relating to update data of the control program Pa already stored in the storage unit 43. The value of the Pa flag is kept at 1 until Na pieces of partial data are input to the first input/output unit 41.

If partial data relating to update data of the control program Pb is input to the first input/output unit 41, the control unit 44 executes the first update data storing processing relating to the control program Pb.

A value of a flag (hereinafter referred to as a "Pb flag") relating to the control program Pb is stored in the storage unit 43. The value of the Pb flag is set to 0 or 1 by the control unit 44. The value of the Pb flag being 0 indicates that partial data relating to update data of the control program Pb is not being repeatedly input from the diagnostic tool 20 to the first input/output unit 41. The value of the Pb flag being 1 indicates that partial data relating to update data of the control program Pb is being repeatedly input from the diagnostic tool 20 to the first input/output unit 41.

The first update data storing processing relating to the control program Pb is similar to the first update data storing processing relating to the control program Pa. The first update data storing processing relating to the control program Pb can be described by changing the control program Pa, the Pa flag, and the integer Na to the control program Pb, the Pb flag, and the integer Nb, respectively, in the description of the first update data storing processing relating to the control program Pa.

Figure 4:
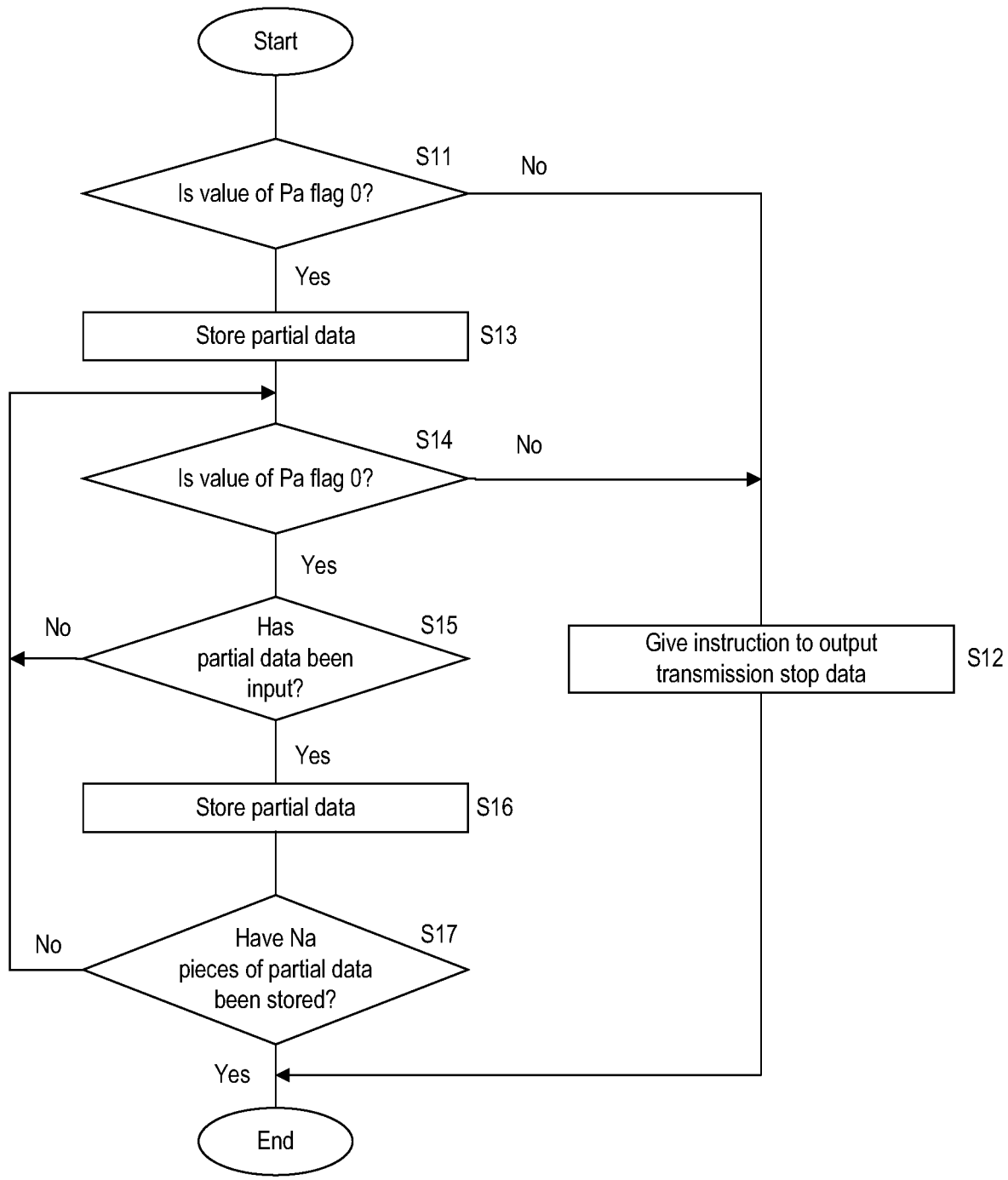
FIG. 4 is a flowchart showing a procedure of second update data storing processing relating to a control program.

FIG. 4 is a flowchart showing a procedure of the second update data storing processing relating to the control program Pa. If partial data relating to update data of the control program Pa is input from the wireless device 13 to the second input/output unit 42, the control unit 44 executes the second update data storing processing relating to the control program Pa.

In the second update data storing processing relating to the control program Pa, the control unit 44 first determines whether or not the value of the Pa flag is 0 (step S11). As described above, the value of the Pa flag being 0 indicates that partial data relating to update data of the control program Pa is not being repeatedly input to the first input/output unit 41. The value of the Pa flag being 1 indicates that partial data relating to update data of the control program Pa is being repeatedly input to the first input/output unit 41.

If it is determined that the value of the Pa flag is not 0, i.e., the value of the Pa flag is 1 (S11: NO), partial data relating to update data of the control program Pa is being repeatedly input to the first input/output unit 41, and therefore the control unit 44 instructs the second input/output unit 42 to output transmission stop data (step S12). As a result, the second input/output unit 42 outputs the transmission stop data to the wireless device 13, and the wireless device 13 wirelessly transmits the transmission stop data to the server 30. Upon receiving the transmission stop data, the server 30 stops repeated transmission of partial data relating to update data of the control program Pa. After executing step S12, the control unit 44 ends the second update data storing processing relating to the control program Pa without storing, in the storage unit 43, partial data that has been input to the second input/output unit 42 when the second update data storing processing has been started.

Upon determining that the value of the Pa flag is 0 (S11: YES), the control unit 44 stores the partial data input to the second input/output unit 42 in the storage unit 43 (step S13), and again determines whether or not the value of the flag is 0 (step S14). Thus, the control unit 44 monitors whether or not the diagnostic tool 20 has started to output partial data relating to update data of the control program Pa.

Upon determining that the value of the Pa flag is not 0, i.e., the value of the Pa flag is 1 (S14: NO), the control unit 44 executes step S12 and the server 30 stops repeated transmission of partial data relating to update data of the control program Pa. Also, in the first update data storing processing relating to the control program Pa, all data that has been stored in the second update data storing processing relating to the control program Pa is deleted from the storage unit 43 after the value of the Pa flag is set to 1.

Upon determining that the value of the Pa flag is 0 (S14: YES), the control unit 44 determines whether or not partial data relating to update data of the control program Pa has been input to the second input/output unit 42 (step S15). Upon determining that partial data has not been input (S15: NO), the control unit 44 executes step S14 and waits until the value of the Pa flag is changed to 1 or partial data relating to update data of the control program Pa is input to the second input/output unit 42.

Upon determining that partial data has been input (S15: YES), the control unit 44 stores the partial data input to the second input/output unit 42 in the storage unit 43 (step S16), and determines whether or not Na pieces of partial data relating to update data of the control program Pa have been stored in the storage unit 43 (step S17). Upon determining that Na pieces of partial data have not been stored (S17: NO), the control unit 44 executes step S14 and again waits until the value of the Pa flag is changed to 1 or partial data relating to update data of the control program Pa is newly input to the second input/output unit 42.

Upon determining that Na pieces of partial data have been stored (S17: YES), the control unit 44 ends the second update data storing processing relating to the control program Pa.

If partial data relating to update data of the control program Pb is input from the wireless device 13 to the second input/output unit 42, the control unit 44 executes the second update data storing processing relating to the control program Pb. The second update data storing processing relating to the control program Pb is similar to the second update data storing processing relating to the control program Pa. The second update data storing processing relating to the control program Pb can be described by changing the control program Pa, the Pa flag, and the integer Na to the control program Pb, the Pb flag, and the integer Nb, respectively, in the description of the second update data storing processing relating to the control program Pa.

Figure 5:
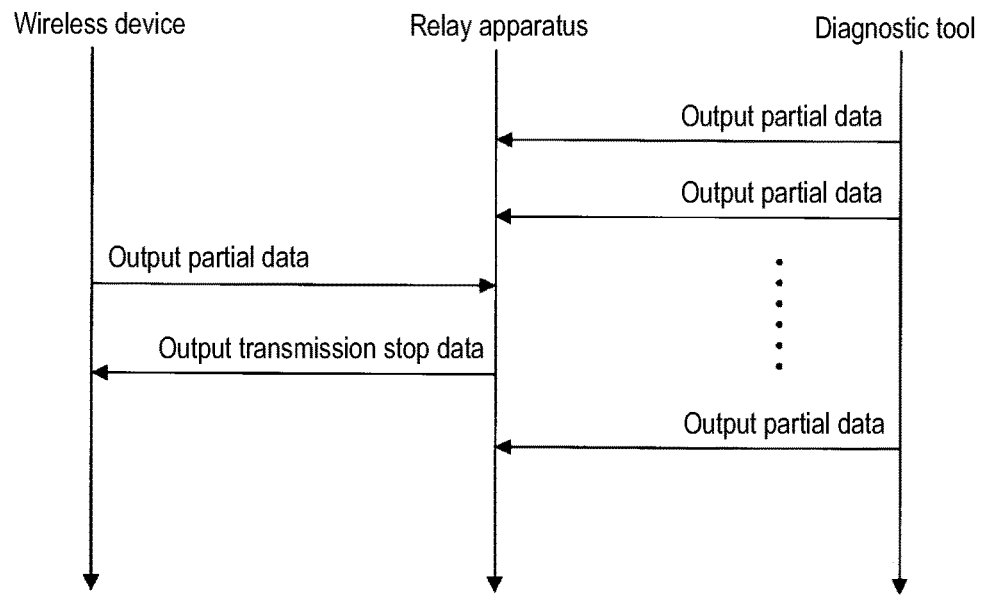
FIG. 5 is a sequence diagram showing an example of operations of the communication system.

FIG. 5 is a sequence diagram showing an example of operations of the communication system 1. Assume that the diagnostic tool 20 is repeatedly outputting partial data relating to update data of the control program Pa to the first input/output unit 41 of the relay apparatus 10. Every time partial data is input to the first input/output unit 41, the control unit 44 of the relay apparatus 10 stores the partial data input to the first input/output unit 41 in the storage unit 43.

Assume that, under the above circumstances, partial data relating to update data of the control program Pa is transmitted by the server 30 to the wireless device 13 and is output by the wireless device 13 to the second input/output unit 42. In this case, the control unit 44 instructs the second input/output unit 42 to output transmission stop data to the wireless device 13, and the wireless device 13 wirelessly transmits the transmission stop data to the server 30. As a result, the server 30 stops repeated transmission of partial data relating to update data of the control program Pa.

The diagnostic tool 20 repeatedly outputs partial data relating to update data of the control program Pa until output of Na pieces of partial data is complete. The control unit 44 stores the Na pieces of partial data in the storage unit 43.

Figure 6:
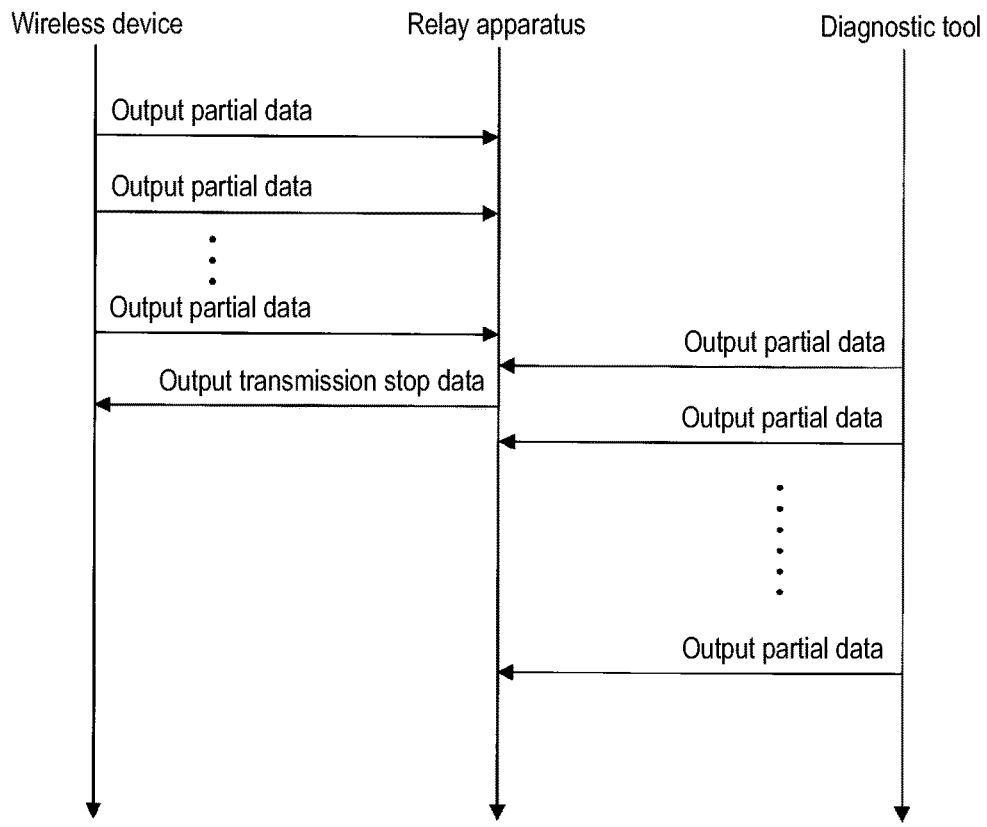
FIG. 6 is a sequence diagram showing another example of operations of the communication system.

FIG. 6 is a sequence diagram showing another example of operations of the communication system 1. Assume that the server 30 is repeatedly transmitting partial data relating to update data of the control program Pa to the wireless device 13, and the wireless device 13 is repeatedly outputting partial data relating to update data of the control program Pa to the second input/output unit 42 of the relay apparatus 10. Every time partial data is input to the second input/output unit 42, the control unit 44 of the relay apparatus 10 stores the partial data input to the second input/output unit 42 in the storage unit 43.

Assume that partial data relating to update data of the control program Pa is input from the diagnostic tool 20 to the first input/output unit 41 of the relay apparatus 10 via wired communication while partial data relating to update data of the control program Pa is being repeatedly input to the second input/output unit 42. In this case, the control unit 44 deletes, from the storage unit 43, all partial data that has been input from the wireless device 13 to the second input/output unit 42 and stored in the storage unit 43, and stops storing partial data input to the second input/output unit 42. Then, the control unit 44 instructs the second input/output unit 42 to output transmission stop data to the wireless device 13. As a result, the wireless device 13 wirelessly transmits the transmission stop data to the server 30, and the server 30 stops repeated transmission of partial data relating to update data of the control program Pa. The control unit 44 functions as a deletion unit. The second input/output unit 42 also functions as an output unit.

The diagnostic tool 20 repeatedly outputs partial data relating to update data of the control program Pa until output of Na pieces of partial data is complete. Every time partial data relating to update data of the control program Pa is input from the diagnostic tool 20 to the first input/output unit 41, the control unit 44 stores, in the storage unit 43, the partial data input from the diagnostic tool 20 to the first input/output unit 41 via wired communication. The control unit 44 also functions as a storing unit.

The description given with reference to FIGS. 5 and 6 is a description of a case in which partial data output by the wireless device 13 and the diagnostic tool 20 is partial data relating to update data of the control program Pa. Operations in a case in which partial data output by the wireless device 13 and the diagnostic tool 20 is partial data relating to update data of the control program Pb are similar to operations in the case in which partial data output by the wireless device 13 and the diagnostic tool 20 is partial data relating to update data of the control program Pa.

Note that, if a control program that corresponds to partial data input from the diagnostic tool 20 to the first input/output unit 41 differs from a control program that corresponds to partial data input from the wireless device 13 to the second input/output unit 42, the control unit 44 does not cause the server 30 to stop repeated transmission of partial data. That is, the control unit 44 stores partial data relating to update data of the control program Pa while storing partial data relating to update data of the control program Pb.

Figure 7:
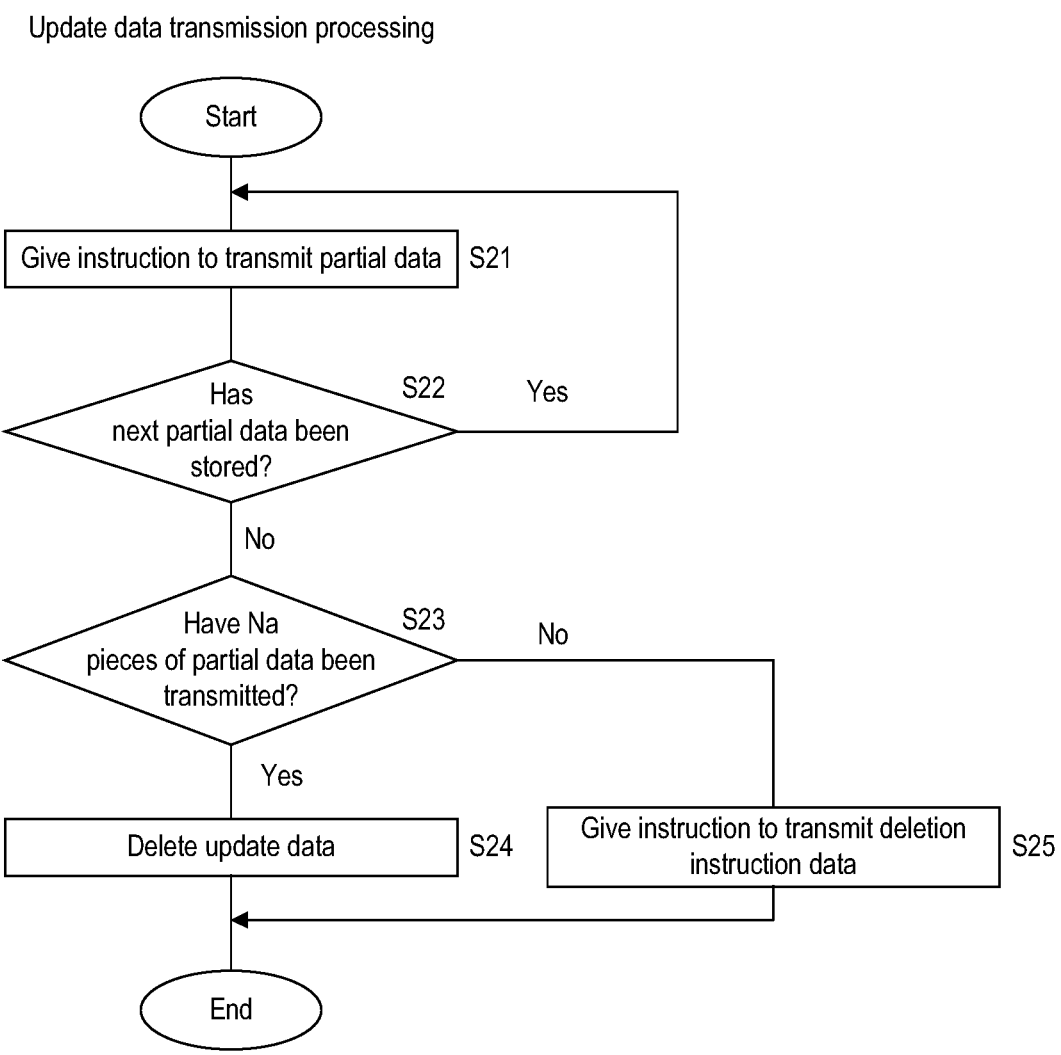
FIG. 7 is a flowchart showing a procedure of update data transmission processing relating to a control program.

FIG. 7 is a flowchart showing a procedure of the update data transmission processing relating to the control program Pa. As described above, partial data includes number information that indicates an arrangement number. The arrangement number of partial data relating to update data of the control program Pa is an integer of at least 1 and not larger than Na. As described above, update data is realized as a result of Na pieces of partial data being arranged in the order of arrangement numbers. In the following description, partial data that has an arrangement number k (k: natural number) will be referred to as the "k-th partial data".

The server 30 sequentially transmits, to the wireless device 13, partial data in the order of arrangement numbers starting from the first partial data. The diagnostic tool 20 sequentially outputs, to the first input/output unit 41, partial data in the order of arrangement numbers starting from the first partial data. The communication units 40a and 40b sequentially transmit, respectively to the ECUs 11a and 11b, partial data in the order of arrangement numbers starting from the first partial data.

If the first partial data relating to update data of the control program Pa is stored in the storage unit 43, the control unit 44 executes the update data transmission processing relating to the control program Pa.

In the update data transmission processing relating to the control program Pa, the control unit 44 first instructs the communication unit 40a to transmit partial data that is stored in the storage unit 43 (step S21). As a result, the communication unit 40a transmits the partial data to the ECU 11a. Next, the control unit 44 determines whether or not the next partial data relating to update data of the control program Pa is stored in the storage unit 43 before a predetermined period of time elapses from when step S21 is executed (step S22). If the first partial data has been stored, for example, the next partial data is the second partial data.

The predetermined period of time is longer than a time interval at which the server 30 transmits partial data to the wireless device 13 and is longer than a time interval at which the diagnostic tool 20 outputs partial data to the first input/output unit 41. Accordingly, unless all partial data is deleted in step S2 of the first update data storing processing relating to the control program Pa or storing of Na pieces of partial data is complete, the next partial data is stored in the storage unit 43 before the predetermined period of time elapses from when step S21 is executed.

Upon determining that the next partial data has been stored (S22: YES), the control unit 44 executes step S21 and the communication unit 40a transmits the next partial data to the ECU 11a. Upon determining that the next partial data has not been stored (S22: NO), the control unit 44 determines whether or not Na pieces of partial data have been transmitted by the communication unit 40a (step S23).

Upon determining that Na pieces of partial data have been transmitted (S23: YES), the control unit 44 deletes update data that is constituted by the Na pieces of partial data from the storage unit 43 (step S24). Upon determining that Na pieces of partial data have not been transmitted (S23: NO), the control unit 44 determines that the server 30 has stopped repeated transmission of partial data, and instructs the communication unit 40a to transmit deletion instruction data (step S25).

As a result, the communication unit 40a transmits the deletion instruction data to the ECU 11a. As described above, upon receiving the deletion instruction data, the ECU 11a deletes all partial data transmitted by the communication unit 40a. Accordingly, the ECU 11a does not update the control program Pa using update data relating to partial data transmitted by the server 30.

After executing step S24 or S25, the control unit 44 ends the update data transmission processing relating to the control program Pa.

If the first partial data relating to update data of the control program Pb is stored in the storage unit 43, the control unit 44 executes the update data transmission processing relating to the control program Pb. The update data transmission processing relating to the control program Pb is similar to the update data transmission processing relating to the control program Pa. The update data transmission processing relating to the control program Pb can be described by changing the control program Pa, the communication unit 40a, and the integer Na to the control program Pb, the communication unit 40b, and the integer Nb, respectively, in the description of the update data transmission processing relating to the control program Pa. Each of the communication units 40a and 40b functions as a transmission unit.

As described above, every time the control unit 44 stores partial data relating to update data of the control program Pa (or the control program Pb), the communication unit 40a (or the communication unit 40b) transmits the partial data to the ECU 11a (or the ECU 11b), and the ECU 11a (or the ECU 11b) stores the received partial data. Upon receiving deletion instruction data, the ECUs 11a and 11b delete all of the received partial data. As described above, if update data is stored and the vehicle 100 is in a state in which the control program Pa (or the control program Pb) can be updated, the ECU 11a (or the ECU 11b) updates the control program Pa (or the control program Pb) using the update data.

Usually, updating that is performed using update data received from the server 30 is executed at an unspecified location after receiving permission from an occupant of the vehicle 100, and updating that is performed using update data input from the diagnostic tool 20 is executed by a dealer in a shop, a factory, etc., by operating the operation portion of the diagnostic tool 20. In view of the above circumstances, updating performed using update data input from the diagnostic tool 20 is more important than updating performed using update data received from the server 30.

In the relay apparatus 10, if partial data relating to update data of the control program Pa is input from the diagnostic tool 20 to the first input/output unit 41 while partial data relating to update data of the control program Pa is being repeatedly input from the wireless device 13 to the second input/output unit 42, the control unit 44 stops storing partial data input to the second input/output unit 42. Then, the control unit 44 stores partial data repeatedly input to the first input/output unit 41. Therefore, the control program Pa can be prevented from being unnecessarily updated using update data transmitted by the server 30 to the wireless device 13.

Effects similar to those described about the control program Pa can be achieved for the control program Pb as well.

Note that, if the ECUs 11a and 11b do not have a storage capacity large enough to store update data, the control unit 44 of the relay apparatus 10 executes update data transmission processing when the update data is stored in the storage unit 43 and the vehicle 100 is in a state in which updating can be performed. In this update data transmission processing, the control unit 44 instructs the communication unit 40a (or the communication unit 40b) to sequentially transmit partial data. Every time the ECU 11a (or the ECU 11b) receives partial data, the ECU 11a (or the ECU 11b) partially updates the control program Pa (or the control program Pb) using the received partial data, and deletes the received partial data. The ECU 11a (or the ECU 11b) updates the entire control program Pa (or control program Pb) by repeatedly performing partial updating of the control program and deletion of received partial data.

Embodiment 2

In the relay apparatus 10 of Embodiment 1, if partial data is input from the diagnostic tool 20 to the first input/output unit 41 while partial data is being repeatedly input to the second input/output unit 42, the control unit 44 unconditionally deletes all partial data that has been input to the second input/output unit 42. However, a configuration is also possible in which the control unit 44 does not unconditionally delete all partial data input to the second input/output unit 42.

The following describes Embodiment 2 regarding matter that differs from Embodiment 1. Configurations other than the following configurations are the same as those in Embodiment 1, and therefore constitutional units that are the same as those in Embodiment 1 are denoted using the same reference numerals as those used in Embodiment 1 and a description thereof is omitted.

In the communication system 1 of Embodiment 2, the first input/output unit 41 of the relay apparatus 10 outputs, to the diagnostic tool 20, designation data that designates partial data to be output by the diagnostic tool 20. The designation data designates the arrangement number with respect to update data of the control program Pa or the control program Pb. For example, the designation data designates the 10th to the Na-th partial data that constitute update data of the control program Pa. If the designation data is input, the diagnostic tool 20 sequentially outputs one or more pieces of partial data that are designated by the input designation data, to the first input/output unit 41.

Figure 8:
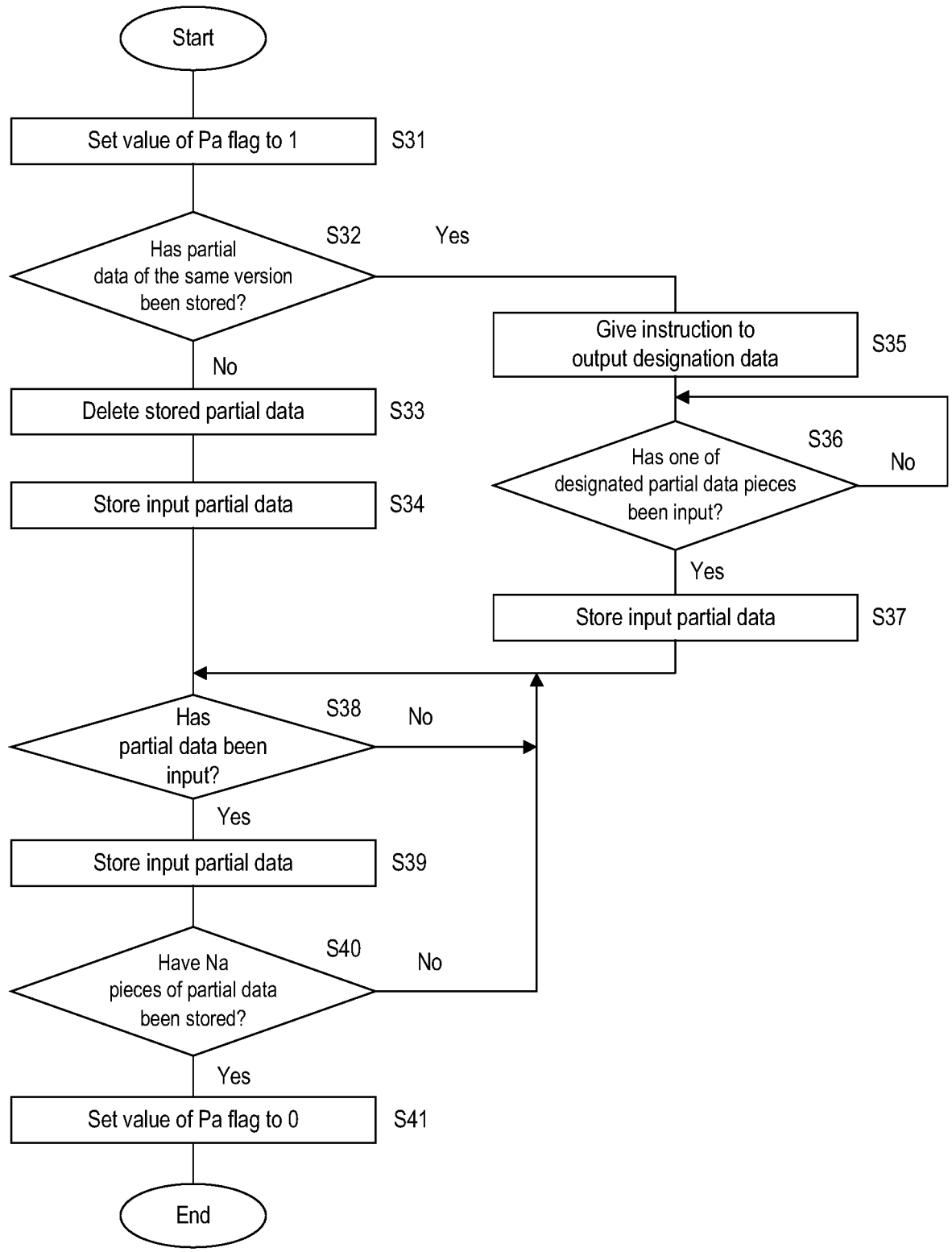
FIG. 8 is a flowchart showing a procedure of first update data storing processing in Embodiment 2.

FIG. 8 is a flowchart showing a procedure of the first update data storing processing in Embodiment 2. The first update data storing processing shown in FIG. 8 is processing relating to the control program Pa. Similarly to Embodiment 1, if partial data relating to update data of the control program Pa is input to the first input/output unit 41, the control unit 44 executes the first update data storing processing relating to the control program Pa.

Note that partial data includes version information and number information as described in Embodiment 1. Version information regarding partial data relating to update data of the control program Pa indicates a version of the control program Pa after being updated.

Steps S31, S33, S34, and S38 to S41 of the first update data storing processing in Embodiment 2 are similar to steps S1, S2, S3, and S4 to S7, respectively. Therefore, a detailed description of steps S31, S33, S34, and S38 to S41 is omitted.

In the first update data storing processing relating to the control program Pa, after executing step S31, the control unit 44 determines whether or not partial data of a version that is the same as a version indicated by version information regarding partial data input to the first input/output unit 41 has been stored in the storage unit 43 (step S32).

Assume that partial data relating to update data of the control program Pa is input to the first input/output unit 41 while partial data relating to update data of the control program Pa is being repeatedly input from the wireless device 13 to the second input/output unit 42, and the first update data storing processing relating to the control program Pa is started. In this case, the control unit 44 determines, in step S32, whether or not a version that is indicated by version information regarding the partial data input to the first input/output unit 41 is the same as a version that is indicated by version information regarding partial data that has been stored in the storage unit 43, i.e., partial data that has been input to the second input/output unit 42. The control unit 44 also functions as a determination unit.

Upon determining that partial data of the same version has not been stored (S32: NO), the control unit 44 executes steps S33 and S34. As a result, all partial data that has already been stored in the storage unit 43 with respect to update data of the control program Pa is deleted, and the partial data input to the first input/output unit 41 when the first update data storing processing has been started is stored in the storage unit 43.

Upon determining that partial data of the same version has been stored (S32: YES), the control unit 44 instructs the first input/output unit 41 to output designation data that designates remaining partial data that has not been stored in the storage unit 43 from among Na pieces of partial data (step S35). As a result, the first input/output unit 41 outputs the designation data. When the designation data is input from the first input/output unit 41, the diagnostic tool 20 sequentially outputs partial data indicated by the input designation data, i.e., the remaining partial data that constitutes update data, to the first input/output unit 41. The designation data corresponds to output request data for requesting output of the remaining partial data constituting update data. The first input/output unit 41 also functions as a second output unit.

Note that, if it is determined that partial data of the same version has been stored, the control unit 44 does not store, in the storage unit 43, the partial data input to the first input/output unit 41 when the first update data storing processing is started.

Next, the control unit 44 determines whether or not one of partial data pieces designated by the designation data has been input to the first input/output unit 41 (step S36). Upon determining that none of the partial data pieces designated by the designation data has been input to the first input/output unit 41 (S36: NO), the control unit 44 again executes step S36 and waits until one of the partial data pieces designated by the designation data is input to the first input/output unit 41.

Upon determining that one of the designation data pieces designated by the designation data has been input to the first input/output unit 41 (S36: YES), the control unit 44 stores the partial data input to the first input/output unit 41 in the storage unit 43 (step S37). After executing step S34 or S37, the control unit 44 executes step S38.

Thereafter, the control unit 44 waits for input of partial data from the diagnostic tool 20 until Na pieces of partial data relating to update data of the control program Pa are stored in the storage unit 43.

In Embodiment 2 as well, the first update data storing processing relating to the control program Pb is similar to the first update data storing processing relating to the control program Pa. The first update data storing processing relating to the control program Pb can be described by changing the control program Pa, the Pa flag, and the integer Na to the control program Pb, the Pb flag, and the integer Nb, respectively, in the description of the first update data storing processing relating to the control program Pa.

Figure 9:
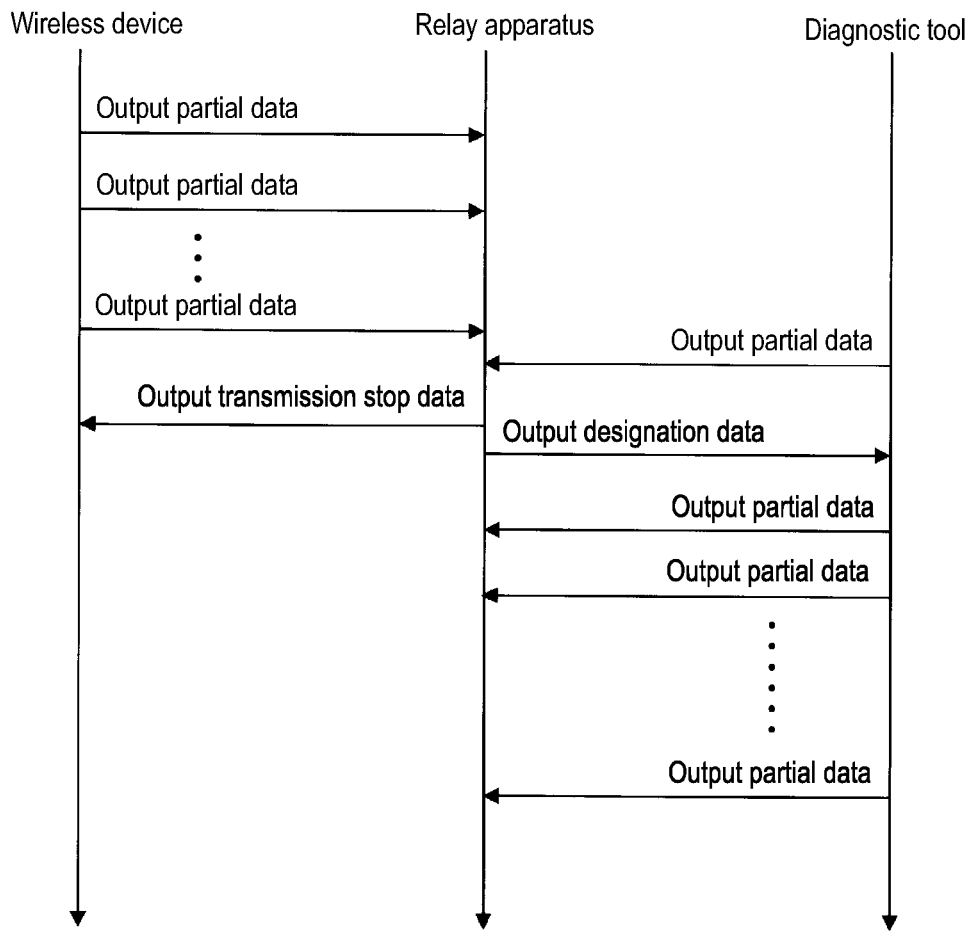
FIG. 9 is a sequence diagram showing an example of operations of the communication system.

FIG. 9 is a sequence diagram showing an example of operations of the communication system 1. Assume that the server 30 is repeatedly transmitting partial data relating to update data of the control program Pa to the wireless device 13, and the wireless device 13 is repeatedly outputting partial data relating to update data of the control program Pa to the second input/output unit 42 of the relay apparatus 10. Every time partial data is input to the second input/output unit 42, the control unit 44 of the relay apparatus 10 stores the partial data input to the second input/output unit 42 in the storage unit 43.

Assume that partial data relating to update data of the control program Pa is input from the diagnostic tool 20 to the first input/output unit 41 of the relay apparatus 10 via wired communication while partial data relating to update data of the control program Pa is being repeatedly input to the second input/output unit 42. In this case, the control unit 44 stops storing partial data input to the second input/output unit 42 and instructs the second input/output unit 42 to output transmission stop data to the wireless device 13. As a result, the server 30 stops repeated transmission of partial data relating to update data of the control program Pa.

Next, the control unit 44 determines whether or not a version that is indicated by version information regarding the partial data input to the first input/output unit 41 is the same as a version that is indicated by version information regarding partial data input to the second input/output unit 42. Upon determining that the version indicated by the version information regarding the partial data input to the first input/output unit 41 is the same as the version indicated by the version information regarding the partial data input to the second input/output unit 42, the control unit 44 instructs the first input/output unit 41 to output designation data to request the diagnostic tool 20 to output remaining partial data that constitutes update data of the control program Pa. When the designation data is input from the first input/ output unit 41, the diagnostic tool 20 sequentially outputs partial data designated by the input designation data, i.e., the remaining partial data, to the first input/output unit 41.

The diagnostic tool 20 repeatedly outputs partial data relating to update data of the control program Pa until storing of Na pieces of partial data is complete. Every time partial data relating to update data of the control program Pa is input from the diagnostic tool 20 to the first input/output unit 41, the control unit 44 stores, in the storage unit 43, the partial data input from the diagnostic tool 20 to the first input/output unit 41 via wired communication.

FIG. 10 is a schematic diagram showing a configuration of update data.

Assume that a version indicated by version information regarding partial data input to the first input/output unit 41 is the same as a version indicated by version information regarding partial data input to the second input/output unit 42. In this case, out of Na pieces of partial data constituting update data, the first to the $20^{th}$ partial data is constituted by partial data input from the wireless device 13, and the $21^{st}$ to the Na-th partial data is constituted by partial data input from the diagnostic tool 20, as shown in FIG. 10, for example. Therefore, the time it takes to acquire the update data is short in the relay apparatus 10 of Embodiment 2.

The communication system 1 and the relay apparatus 10 of Embodiment 2 have effects similar to those of the communication system 1 and the relay apparatus 10 of Embodiment 1, respectively.

Note that a configuration is also possible in which, in the first update data storing processing of Embodiment 2, if it is determined that partial data of the same version has been stored, the control unit 44 instructs the first input/output unit 41 to output, to the diagnostic tool 20, data for stopping repeated output of partial data, and ends the processing.

In this configuration, if a version indicated by version information regarding partial data input to the first input/output unit 41 is the same as a version indicated by version information regarding partial data input to the second input/output unit 42, update data is acquired from the server 30, rather than the diagnostic tool 20. In this configuration, partial data needs to be continuously acquired from the server 30, and therefore, the value of the flag is set to 1 after determination of the version if it is determined that partial data of the same version has not been stored. If it is determined that partial data of the same version has been stored, the control unit 44 keeps the value of the flag at 0.

Note that, in Embodiments 1 and 2, the number of ECUs connected to the relay apparatus 10 is not limited to two and may also be three or more. Furthermore, a configuration is also possible in which a plurality of communication buses are connected to the relay apparatus 10 and one or more ECUs are connected to each communication bus. In this case, the relay apparatus 10 relays communication between an ECU that is connected to a communication bus and an ECU that is connected to another communication bus in accordance with a CAN protocol, for example.

Also, assume that partial data is input from the diagnostic tool 20 to the first input/output unit 41 while partial data is being repeatedly input from the wireless device 13 to the second input/output unit 42 of the relay apparatus 10. At this time, the control unit 44 may also stop storing partial data input to the second input/output unit 42 regardless of the control program to be constituted by update data relating to the partial data input to the second input/output unit 42.

Specifically, if partial data relating to update data of the control program Pa is input from the diagnostic tool 20 to the first input/output unit 41 while partial data relating to update data of the control program Pb is being repeatedly input from the wireless device 13 to the second input/output unit 42, the control unit 44 may also stop storing partial data input to the second input/output unit 42. In this case as well, the control unit 44 deletes all partial data that has been input to the second input/output unit 42 and stored in the storage unit 43, and causes the server 30 to stop repeated transmission of partial data.

Partial data output by the diagnostic tool 20 and partial data transmitted by the server 30 are not limited to partial data that is a portion of update data that is used to update the control programs Pa and Pb, and may also be partial data that is a portion of update data that is used to update the control program Pr of the relay apparatus 10, for example. In this case, the control unit 44 updates the control program Pr by executing an update program (not shown) when the vehicle 100 is in a state in which the control program Pr can be updated, e.g., when the ignition switch of the vehicle 100 is turned OFF, for example.

An apparatus to which this configuration can be applied is not limited to a relay apparatus that relays communication, and is only required to be a control apparatus that performs control as a result of a CPU executing a control program.

Disclosed Embodiments 1 and 2 are illustrative examples in all aspects and should not be considered as restrictive. The scope of the present disclosure is defined not by the above descriptions but by the claims, and is intended to encompass all modifications within the meanings and scope that are equivalent to the claims.

The invention claimed is:

1. A storing apparatus comprising:
  a first input unit that is configured to be detachably connected to an external apparatus and to which a first partial data that is input from the external apparatus via a wired connection;
  a second input unit configured to receive a second partial data via wireless communication;
  wherein the first partial data and the second partial data are a portion of an update data that is directed to update a control program of a first control unit and a second control unit;
  a storage unit in which the first partial data and the second partial data are stored;
  a storing unit including a non-transitory, machine-readable medium storing instructions which, when executed by at least one programmable processor, causes the at least one programmable processor to perform operations such that, if the first partial data is input to the first input unit while the second partial data is being repeatedly input to the second input unit, the storing unit stops storing the second partial data input to the second input unit and stores the first partial data input to the first input unit in the storage unit;
  a determination unit configured such that, if the first partial data is input to the first input unit while the second partial data is being repeatedly input to the second input unit, the determination unit determines whether or not a version of the control program after being updated using update data relating to the first partial data input to the first input unit will be the same as a version of the control program after being updated using update data relating to the second partial data input to the second input unit; and
  a second output unit configured such that, if it is determined by the determination unit that the version of the control program after being updated using the update data relating to the first partial data input to the first input unit will be the same as the version of the control program after being updated using the update data relating to the second partial data input to the second input unit, the second output unit outputs, to the external apparatus, output request data for requesting output of remaining portions of data that constitutes the update data.

2. The storing apparatus according to claim 1, further comprising
an output unit configured such that, if the first partial data is input to the first input unit while the second partial data is being repeatedly input to the second input unit, the output unit outputs transmission stop data for giving an instruction to stop repeated wireless transmission of the second partial data.

3. The storing apparatus according to claim 1, further comprising:
a deletion unit configured such that, if the first partial data is input to the first input unit while the second partial data is being repeatedly input to the second input unit, the deletion unit deletes, from the storage unit, the second partial data that has been input to the second input unit and stored in the storage unit.

4. A communication system comprising:
a storing apparatus configured to store a first partial data and a second partial data, the first partial data and the second partial data being a portion of update data that is used to update a control program; and
a processing apparatus that is connected to the storing apparatus and configured to execute processing by executing the control program,
wherein the storing apparatus includes:
a first input unit that is configured to be detachably connected to a diagnostic tool and to which the first partial data is input from an external apparatus via a wired connection;
a second input unit to which the second partial data received via wireless communication is input;
a storage unit in which the first partial data and the second partial data are stored;
a storing unit including a non-transitory, machine-readable medium storing instructions which, when executed by at least one programmable processor, causes the at least one programmable processor to perform operations such that,
if the second partial data is input to the second input unit, the storing unit stores the second partial data input to the second input unit in the storage unit, and if the first partial data is input to the first input unit while the second partial data is being repeatedly input to the second input unit, the storing unit stops storing the second partial data input to the second input unit and stores the first partial data input to the first input unit in the storage unit;
a determination unit configured such that, if the first partial data is input to the first input unit while the second partial data is being repeatedly input to the second input unit, the determination unit determines whether or not a version of the control program after being updated using update data relating to the first partial data input to the first input unit will be the same as a version of the control program after being updated using update data relating to the second partial data input to the second input unit; and
a second output unit configured such that, if it is determined by the determination unit that the version of the control program after being updated using the update data relating to the first partial data input to the first input unit will be the same as the version of the control program after being updated using the update data relating to the second partial data input to the second input unit, the second output unit outputs, to the external apparatus, output request data for requesting output of remaining portions of data that constitutes the update data; and
a transmission unit configured to transmit the remaining portions data to the processing apparatus.

5. A storing method comprising:
in response to a first partial data that is a portion of an update data that is used to update a control program that is received via wireless communication, storing the received first partial data;
in response to a second partial data that is a portion of the update data that is used to update the control program that is input via wired communication while the first partial data is being repeatedly received via the wireless communication, stopping storing the first partial data received via the wireless communication;
in response to the second partial data that is input via the wired communication while the first partial data is being repeatedly received via the wireless communication, storing the second partial data input via the wired communication;
determining whether or not a version of the control program after being updated using update data relating to the second partial data input by the wired communication will be the same as a version of the control program after being updated using update data relating to the first partial data input by the wireless communication when the second partial data that is input via the wired communication while the first partial data is being repeatedly input via the wireless communication; and
in response to that it is determined that the version of the control program after being updated using the update data relating to the second partial data input via the wired communication will be the same as the version of the control program after being updated using the update data relating to the first partial data input via the wireless communication, the second output unit outputs, to the external apparatus, output request data for requesting output of remaining partial portions data that constitutes the update data.

6. A computer program product including a non-transitory, machine-readable medium storing instructions which, when executed by at least one programmable processor, causes the at least one programmable processor to execute the followings:
if a first partial data that is a portion of update data that is used to update a control program is received via wireless communication, storing the received first partial data,
if a second partial data that is a portion of the update data that is used to update the control program is input via wired communication while the first partial data is being repeatedly received via the wireless communication, stopping storing the first partial data received via the wireless communication;
if the second partial data is input via the wired communication while the first partial data is being repeatedly received via the wireless communication, storing the second partial data received via the wired communication;

determining whether or not a version of the control program after being updated using the update data relating to the second partial data input by the wired communication will be the same as a version of the control program after being updated using the update data relating to the first partial data input by the wireless communication when the second partial data is input via the wired communication while the first partial data is being repeatedly input via the wireless communication; and if it is determined that the version of the control program after being updated using the update data relating to the second partial data input via the wired communication will be the same as the version of the control program after being updated using the update data relating to the first partial data input via the wireless communication, the second output unit outputs, to the external apparatus, output request data for requesting output of remaining portions partial of data that constitutes the update data.

7. The storing apparatus according to claim 2, further comprising:

a deletion unit configured such that, if the first partial data is input to the first input unit while the second partial data is being repeatedly input to the second input unit, the deletion unit deletes, from the storage unit, the second partial data that has been input to the second input unit and stored in the storage unit.

* * * * *